(12) United States Patent
Fink

(10) Patent No.: US 9,862,348 B2
(45) Date of Patent: Jan. 9, 2018

(54) SIDE CURTAIN AIRBAG

(75) Inventor: Michael F. Fink, Mesa, AZ (US)

(73) Assignee: NXGEN TECHNOLOGIES, LLC, Meza, AZ (US)

( * ) Notice: Subject to any disclaimer, the term of this patent is extended or adjusted under 35 U.S.C. 154(b) by 1163 days.

(21) Appl. No.: 12/871,227

(22) Filed: Aug. 30, 2010

(65) Prior Publication Data
US 2011/0062691 A1    Mar. 17, 2011

Related U.S. Application Data

(62) Division of application No. 11/190,499, filed on Jul. 26, 2005, now Pat. No. 7,784,822.

(51) Int. Cl.
*B60R 21/232* (2011.01)
*B60R 21/26* (2011.01)
*B60R 21/239* (2006.01)
*B60R 21/233* (2006.01)
*B60R 21/261* (2011.01)

(52) U.S. Cl.
CPC ............ *B60R 21/232* (2013.01); *B60R 21/26* (2013.01); *B60R 21/239* (2013.01); *B60R 2021/23316* (2013.01); *B60R 2021/2615* (2013.01); *B60R 2021/2617* (2013.01)

(58) Field of Classification Search
CPC ..... B60R 21/232; B60R 21/26; B60R 21/239; B60R 2021/23316; B60R 2021/2615; B60R 2021/2617
USPC ................... 280/729, 730.2, 740, 743.1, 736
See application file for complete search history.

(56) References Cited

U.S. PATENT DOCUMENTS

| 3,762,351 | A | | 10/1973 | Jager |
| 3,855,955 | A | | 12/1974 | Strang |
| 4,530,868 | A | | 7/1985 | Shinmi et al. |
| 5,114,180 | A | | 5/1992 | Kami et al. |
| 5,141,787 | A | | 8/1992 | Yamamoto |
| 5,348,342 | A | | 9/1994 | Haland et al. |
| 5,378,019 | A | * | 1/1995 | Smith et al. ............... 280/743.1 |
| 5,421,610 | A | * | 6/1995 | Kavanaugh et al. ...... 280/743.1 |
| 5,630,620 | A | | 5/1997 | Hirai et al. |
| 5,788,270 | A | | 8/1998 | Håland et al. |

(Continued)

FOREIGN PATENT DOCUMENTS

CN    101389510 A    3/2009
CN    101786442 A    7/2010
(Continued)

OTHER PUBLICATIONS

Translation to JP2003-025946.
(Continued)

*Primary Examiner* — Drew J Brown
(74) *Attorney, Agent, or Firm* — Cantor Colburn LLP

(57) ABSTRACT

An inflatable cushion for a side of a vehicle is provided, the inflatable cushion having a first sheet of material; a second sheet of material, the first sheet of material being secured to the second sheet of material at a seam to define the inflatable cushion; and wherein the seam consists only of: a first plurality of stitches; a peripheral edge portion of the first sheet of material; and a peripheral edge portion of the second sheet of material; and wherein no adhesives or sealants are applied to the first sheet and the second sheet when the seam is formed by applying the first plurality of stitches.

23 Claims, 3 Drawing Sheets

(56) References Cited

U.S. PATENT DOCUMENTS

| | | |
|---|---|---|
| 5,797,621 A | 8/1998 | Ono |
| 5,992,881 A | 11/1999 | Faigle |
| 6,009,029 A | 12/1999 | Sher |
| 6,010,149 A | 1/2000 | Riedel et al. |
| 6,037,279 A * | 3/2000 | Brookman et al. ............ 442/71 |
| 6,073,961 A | 6/2000 | Bailey et al. |
| 6,099,029 A | 8/2000 | H.ang.land et al. |
| 6,135,493 A * | 10/2000 | Jost et al. ................. 280/730.2 |
| 6,152,481 A * | 11/2000 | Webber et al. ............ 280/730.2 |
| 6,164,688 A | 12/2000 | Einsiedel et al. |
| 6,170,860 B1 | 1/2001 | Denz et al. |
| 6,177,365 B1 * | 1/2001 | Li ................................. 442/71 |
| 6,199,898 B1 | 3/2001 | Masuda et al. |
| 6,220,629 B1 | 4/2001 | Wipasuramonton et al. |
| 6,237,937 B1 * | 5/2001 | Kokeguchi et al. ....... 280/730.2 |
| 6,293,581 B1 | 9/2001 | Saita et al. |
| 6,312,009 B1 | 11/2001 | Haland et al. |
| 6,325,409 B1 | 12/2001 | Fischer |
| 6,334,625 B1 | 1/2002 | Pausch et al. |
| 6,378,895 B1 | 4/2002 | Brucker et al. |
| 6,394,487 B1 | 5/2002 | Heudorfer et al. |
| 6,402,190 B1 | 6/2002 | Heudorfer et al. |
| 6,402,192 B2 | 6/2002 | Haland et al. |
| 6,409,211 B1 | 6/2002 | Sheng et al. |
| 6,431,589 B1 | 8/2002 | Heigl et al. |
| 6,435,553 B1 | 8/2002 | Wipasuramonton et al. |
| 6,450,529 B1 | 9/2002 | Kalandek et al. |
| 6,457,742 B1 | 10/2002 | Brucker |
| 6,467,802 B2 | 10/2002 | Heigl |
| 6,481,743 B1 | 11/2002 | Tobe et al. |
| 6,494,480 B2 | 12/2002 | Haland et al. |
| 6,502,857 B2 | 1/2003 | Nakanishi et al. |
| 6,520,539 B1 | 2/2003 | Ritter |
| 6,530,595 B2 | 3/2003 | Masuda et al. |
| 6,543,806 B1 | 4/2003 | Fink |
| 6,554,314 B1 * | 4/2003 | Uchiyama et al. ......... 280/730.2 |
| 6,554,315 B2 * | 4/2003 | Freesmeier ................ 280/730.2 |
| 6,595,546 B2 | 7/2003 | Smith |
| 6,612,612 B2 | 9/2003 | Zerbe |
| 6,616,179 B2 | 9/2003 | Tanase et al. |
| 6,623,031 B2 | 9/2003 | Haland et al. |
| 6,654,314 B2 | 11/2003 | Toda et al. |
| 6,666,475 B2 | 12/2003 | Kippschull |
| 6,672,617 B1 | 1/2004 | Gilpatrick et al. |
| 6,715,786 B1 | 4/2004 | Willibey |
| 6,726,243 B2 | 4/2004 | Dinsdale |
| 6,734,123 B2 * | 5/2004 | Veiga et al. ..................... 442/71 |
| 6,742,805 B2 | 6/2004 | Hill |
| 6,749,220 B1 * | 6/2004 | Wipasuramonton et al. ........................... 280/743.1 |
| 6,755,436 B2 | 6/2004 | Hess et al. |
| 6,779,562 B2 | 8/2004 | Tietze |
| 6,860,507 B2 * | 3/2005 | Uchiyama et al. ......... 280/730.2 |
| 6,883,826 B2 | 4/2005 | Fujiwara |
| 6,913,282 B2 | 7/2005 | Takahashi |
| 6,945,556 B2 | 9/2005 | Maertens |
| 6,962,364 B2 | 11/2005 | Ju et al. |
| 7,032,622 B2 | 4/2006 | Kitamura et al. |
| 7,168,735 B2 | 1/2007 | Kino et al. |
| 7,264,269 B2 | 9/2007 | Gu et al. |
| 7,316,415 B2 | 1/2008 | Jamison |
| 7,404,572 B2 | 7/2008 | Salmo et al. |
| 7,418,909 B2 | 9/2008 | Kobayashi |
| 7,431,332 B2 * | 10/2008 | Wipasuramonton et al. ........................... 280/730.2 |
| 7,458,606 B2 | 12/2008 | Charpentier |
| 7,648,162 B2 | 1/2010 | Brough et al. |
| 7,654,567 B2 | 2/2010 | Taylor et al. |
| 7,762,575 B2 | 7/2010 | Jang et al. |
| 7,784,822 B2 | 8/2010 | Fink |
| 7,784,823 B2 | 8/2010 | Heigl et al. |
| 7,828,322 B2 | 11/2010 | Breuninger et al. |
| 7,971,899 B2 | 7/2011 | Abney, III et al. |
| 8,007,002 B2 | 8/2011 | Kalandek et al. |
| 8,282,125 B2 | 10/2012 | Pinsenschaum et al. |
| 8,573,637 B2 | 11/2013 | Fink |
| 8,740,247 B1 | 6/2014 | Jovicevic |
| 8,851,507 B1 | 10/2014 | Kemp et al. |
| 2001/0026062 A1 | 10/2001 | Kosugi et al. |
| 2002/0024203 A1 | 2/2002 | Takahashi |
| 2002/0050117 A1 | 5/2002 | Dasher et al. |
| 2002/0101066 A1 | 8/2002 | Tanase et al. |
| 2002/0105174 A1 | 8/2002 | Tanase et al. |
| 2002/0149180 A1 | 10/2002 | Keshavaraj |
| 2002/0195804 A1 | 12/2002 | Hess et al. |
| 2003/0085559 A1 * | 5/2003 | Nakayasu et al. ............ 280/741 |
| 2003/0124929 A1 * | 7/2003 | Hurst et al. ..................... 442/76 |
| 2003/0178829 A1 | 9/2003 | Dinsdale et al. |
| 2003/0230876 A1 | 12/2003 | Ohrvall et al. |
| 2003/0230877 A1 | 12/2003 | Kim et al. |
| 2003/0234522 A1 | 12/2003 | Thomas |
| 2004/0104561 A1 | 6/2004 | Maertens |
| 2004/0108694 A1 | 6/2004 | Takahashi |
| 2004/0239082 A1 | 12/2004 | Schneider et al. |
| 2004/0242098 A1 | 12/2004 | Bass |
| 2005/0035580 A1 * | 2/2005 | Inman et al. ................. 280/741 |
| 2005/0062272 A1 * | 3/2005 | Smith et al. ................. 280/737 |
| 2005/0146118 A1 | 7/2005 | Kitamura et al. |
| 2006/0001244 A1 | 1/2006 | Taguchi et al. |
| 2006/0017267 A1 | 1/2006 | Fink |
| 2006/0033314 A1 | 2/2006 | Karlbauer et al. |
| 2006/0108776 A1 | 5/2006 | Bradbum |
| 2006/0119084 A1 | 6/2006 | Coon et al. |
| 2006/0205302 A1 | 9/2006 | Woydick |
| 2006/0261579 A1 | 11/2006 | Breed et al. |
| 2007/0228709 A1 | 10/2007 | Khouri |
| 2007/0237961 A1 * | 10/2007 | Li et al. ..................... 428/411.1 |
| 2008/0018082 A1 | 1/2008 | Wieczorek et al. |
| 2008/0084052 A1 | 4/2008 | Abney et al. |
| 2008/0121156 A1 | 5/2008 | Kobayashi |
| 2009/0127837 A1 | 5/2009 | Abney, III et al. |
| 2009/0212540 A1 | 8/2009 | Kamiyama et al. |
| 2009/0297723 A1 | 12/2009 | Keshavaraj et al. |
| 2011/0042924 A1 | 2/2011 | Pinsenschaum et al. |
| 2011/0057425 A1 | 3/2011 | Fink et al. |
| 2014/0125040 A1 | 5/2014 | Fink |

FOREIGN PATENT DOCUMENTS

| | | |
|---|---|---|
| DE | 2058833 A1 | 5/1972 |
| EP | 0380699 A1 | 8/1990 |
| EP | 1462321 A1 | 9/2004 |
| FR | 2767763 A1 | 3/1999 |
| GB | 2312877 A | 11/1997 |
| GB | 2393692 A | 4/2004 |
| GB | 2395170 A | 5/2004 |
| JP | 09301104 A | 11/1997 |
| JP | 11301394 A | 11/1999 |
| JP | 11314555 A | 11/1999 |
| JP | 2000296749 | 10/2000 |
| JP | 2000296750 | 10/2000 |
| JP | 2000296751 | 10/2000 |
| JP | 2000296752 | 10/2000 |
| JP | 2000296753 | 10/2000 |
| JP | 2000296754 | 10/2000 |
| JP | 2001328505 A | 11/2001 |
| JP | 2002019567 A | 1/2002 |
| JP | 2002067861 A | 3/2002 |
| JP | 2002067863 A | 3/2002 |
| JP | 2003072504 | 3/2002 |
| JP | 2002316609 A | 10/2002 |
| JP | 2003025946 A | 1/2003 |
| JP | 2003306118 | 10/2003 |
| JP | 2007076517 A | 3/2007 |
| JP | 2007223373 | 9/2007 |
| KR | 100698730 B1 | 3/2007 |
| KR | 100736464 B1 | 6/2007 |
| WO | 02066297 A1 | 8/2002 |
| WO | 03057540 A1 | 7/2003 |
| WO | 03/101791 A1 | 12/2003 |
| WO | 2005039938 A1 | 5/2005 |
| WO | 2005061287 A1 | 7/2005 |

(56) References Cited

FOREIGN PATENT DOCUMENTS

| WO | 2006014977 A2 | 2/2006 |
|---|---|---|
| WO | 2011022562 A2 | 2/2011 |

OTHER PUBLICATIONS

Written Opinion for PCT/US2010/034925 dated Jan. 18, 2011.
CN Office Action for Application No. 201280033149.9; dated Jul. 3, 2015; 8 pgs.
CN Office Action for Application No. 201280033149.9; dated May 11, 2016; 9 pgs.
English Abstract for CN1017886442A—Jul. 28, 2010; 2 pgs.
English Abstract for CN101389510A—Mar. 18, 2009; 1 pg.
Written Opinion dated Nov. 29, 2012 for Application No. PCT/US2012/0360395.
English Abstract for JPH09301104—Nov. 25, 1997; 1 pg.
English Translation of CN Office Action for Application No. 201280033149.9; dated Jul. 3, 2015; 10 pgs.
English Translation of CN Office Action for Application No. 201280033149.9; dated May 11, 2016; 15 pgs.
European Search Report No. 05 779 363.0-1523 dated Sep. 14, 2009.
International Search Report for PCT/US2010/034925 dated Jan. 18, 2011.
International Search Report dated May 30, 2011 for International Application No. PCT/US2010/046036.
International Search Report for International Application No. PCT/US210/039157; International Filing dated: Jun. 18, 2010; dated Feb. 14, 2011; 5 pgs.
International Search Report for International Application No. PCT/US2011/022926; International Filing Date: Jan. 28, 2011; dated Oct. 31, 2011; 3 pgs.
International Search Report for International Application No. PCT/US2012/036095; International Filing Date: May 2, 2012; dated: Nov. 29, 2012; 5 pgs.
International Search Report for International Application No. PCT/US2011/022933; International Filing Date: Jan. 28, 2011; dated Oct. 21, 2011; 3 pgs.
International Written Opinion for International Application No. PCT/US210/039157; International Filing Date: Jun. 18, 2010; dated Feb. 14, 2011; 3 pgs.
International Written Opinion for International Application No. PCT/US2012/036095; International Filing Date: May 2, 2012; dated Nov. 29, 2012; 4 pgs.
Supplementary European Search Report dated Feb. 5, 2013.
Supplementary European Search Report dated Oct. 28, 2014 for Application No. PCT/US2012036095.
Supplementary European Search Repor dated Jan. 4, 2013 for International Application No./Patent No. 10810506-1523/ 2467281 PCT/US2010046036.
Written Opinion dated May 30, 2011 for International Application No. PCT/US2010/046036.

\* cited by examiner

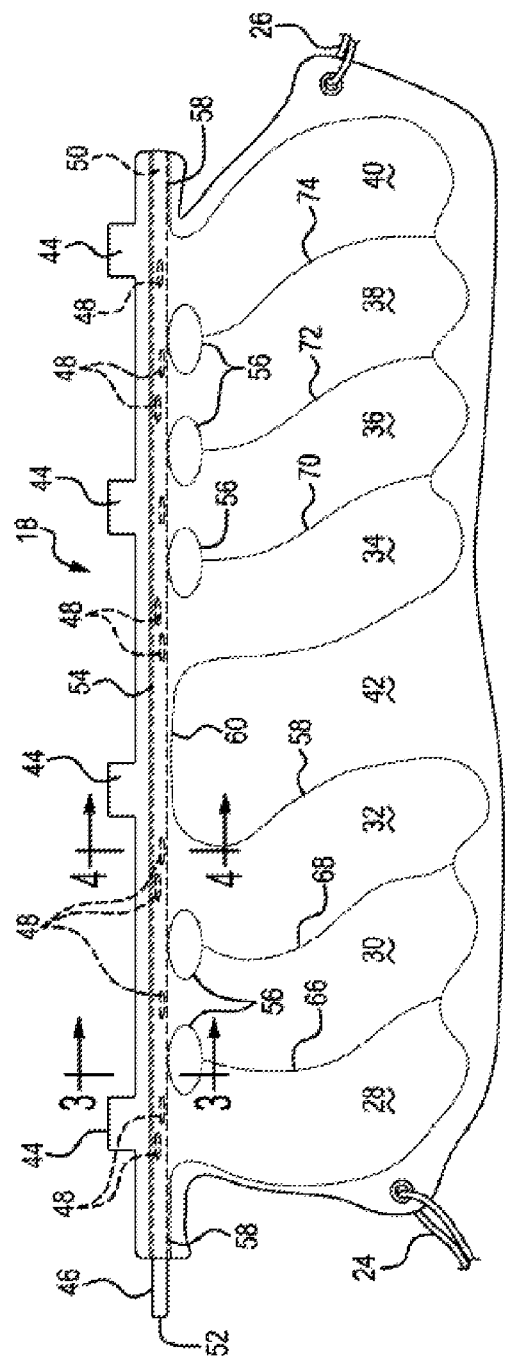
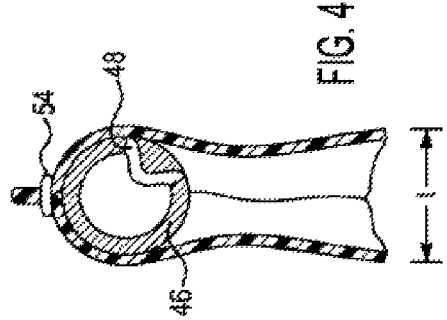
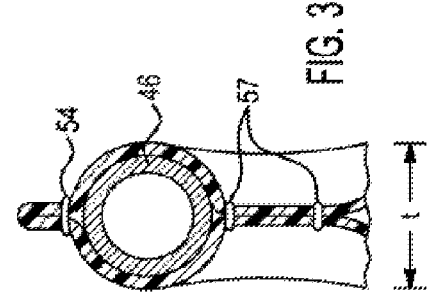
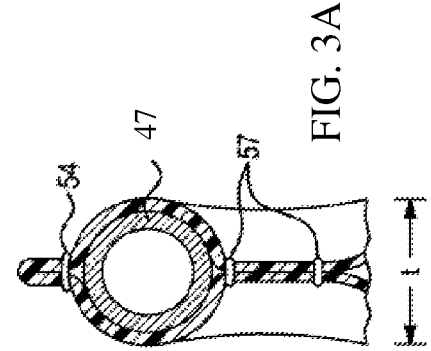

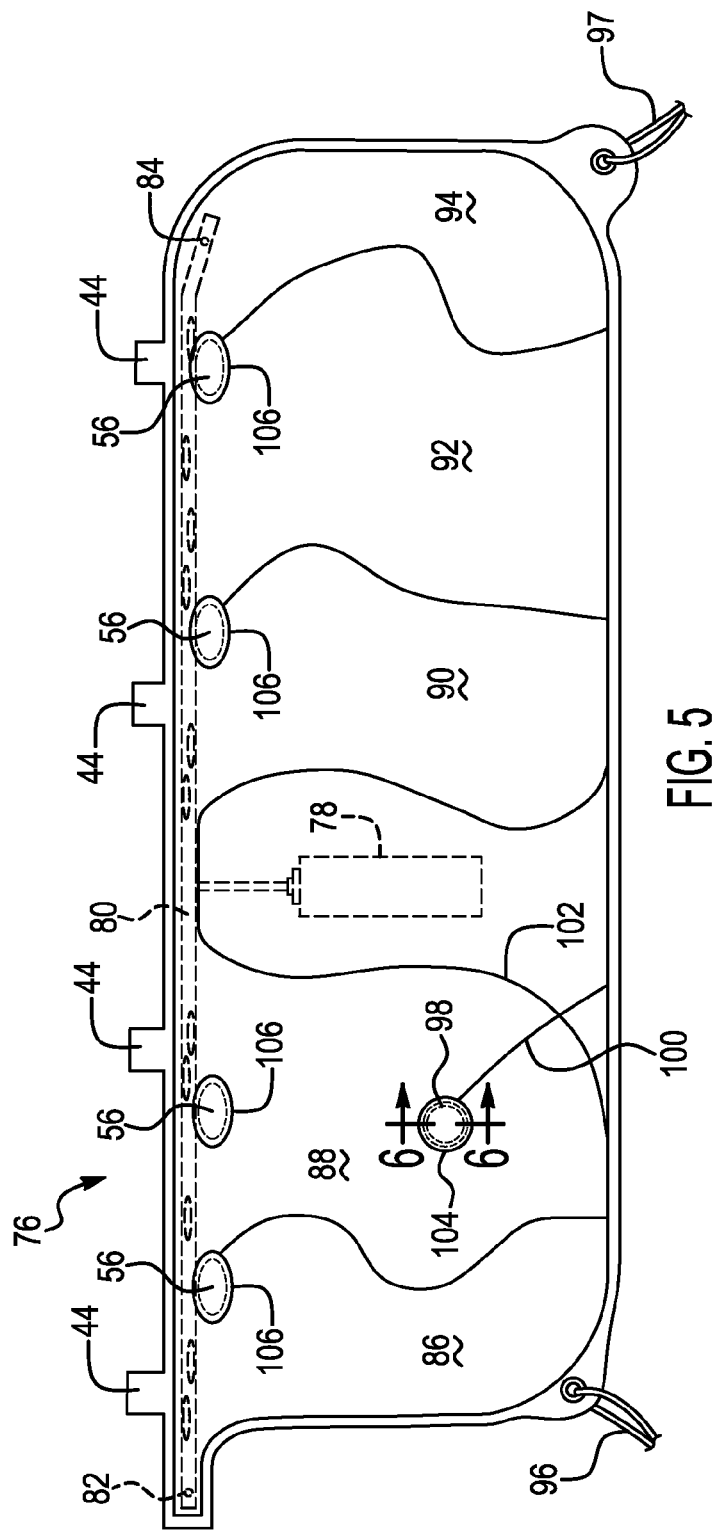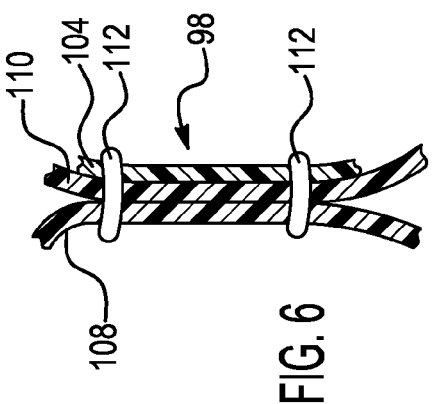

SIDE CURTAIN AIRBAG

CROSS REFERENCE TO RELATED APPLICATIONS

This application is a continuation application of U.S. patent application Ser. No. 11/190,499 filed Jul. 26, 2005, now U.S. Pat. No. 7,787,822, which claims the benefit of U.S. Provisional Patent Application Ser. No. 60/591,301 filed Jul. 26, 2004, the contents each of which are incorporated herein by reference thereto.

BACKGROUND

The present invention relates generally to side curtain airbags used for side impact and rollover protection, although the designs also may be useful in other airbag application types.

Side curtain airbags generally deploy downward from a stowed position within the roofline of vehicle and inflate between the occupant and the vehicle interior side structure, such as the side windows and the A, B and/or C pillars.

A side curtain airbag generally consists of two fabric panels either sewn or interwoven together to create inflatable cells. These cells are inflated during an accident to provide the desired side restraint. A side curtain may have a plurality of cells in various arrangements. Typically, inflatable cells in the range of two inches to as much as eight inches in inflated thickness may be created by sewn or interwoven seams connecting the fabric layers. The cell's inflated thickness (or curtain thickness) is the distance between the two fabric panels when inflated.

Conventional airbag curtain designs have "open flow" between chamber cells. Open flow is characterized by the gas within a cell having substantially open fluid communication with adjacent cells. This configuration allows the gas to uniformly fill the entire airbag because the gas distributes among all of or most all of the airbag cells or inflated regions. An example of an open flow conventional airbag is disclosed in FIG. 2 of U.S. Pat. No. 6,481,743 to Tobe et al., the entire disclosure of which is herein fully incorporated by reference.

SUMMARY OF THE INVENTION

The present invention recognizes and addresses considerations of prior art constructions and methods and provides a novel inflatable airbag for a passenger vehicle.

The present invention provides an airbag comprising a plurality of substantially isolated cells and a delivery tube having a plurality of outlet orifices. The orifices open to the cells, thereby allowing gas from a gas source to enter the cells. In some embodiments, the gas is stored in an inflator that is activated by a sensor in the event of an accident.

At least one outlet orifice of the delivery tube is configured to supply a gas to each of the plurality of substantially isolated cells. Upon inflation of the cells, flow of gas between cells during occupant loading is restricted.

In some embodiments, the delivery tube may incorporate scoops to aid in the inflation of the cells. Such scoops are designed to channel gas into the cells while restricting backflow from the cells into the delivery tube. In addition, sewn seam optimization of the present invention may be used to reduce the amount of gas communication between adjacent cells and between the cells and the atmosphere.

In one exemplary embodiment, an inflatable cushion for a side of a vehicle is provided, the inflatable cushion having a first sheet of material; a second sheet of material, the first sheet of material being secured to the second sheet of material at a seam to define the inflatable cushion; and wherein the seam consists only of: a first plurality of stitches; a peripheral edge portion of the first sheet of material; and a peripheral edge portion of the second sheet of material; and wherein no adhesives or sealants are applied to the first sheet and the second sheet when the seam is formed by applying the first plurality of stitches.

In another exemplary embodiment, a method of inflating an inflatable cushion is provided, the method including the steps of: controlling the flow rate of an inflation gas into the inflatable cushion by limiting an amount of surface area between an exterior surface of a non-rigid fabric diffuser member and an interior surface of an internal passageway formed in the inflatable cushion section, the internal passageway linking and fluidly coupling to each of a plurality of separate inflatable cells only via an inlet opening of each of the plurality of separate inflatable cells, the inflatable cushion being formed from a first material and the diffuser member consists essentially of a non-rigid fabric member formed from a permeable material, the non-rigid fabric member is independent of the first material used to form the inflatable cushion and the permeable material of the non-rigid fabric member is the main source of fluid flow into the inlet openings of the plurality of separate inflatable cells such that the inflation gas must pass through the permeable material, wherein the amount of surface area between the exterior surface of the non-rigid fabric diffuser member and the interior surface of the internal passageway proximate to the inlet opening of each of the plurality of separate inflatable cells is limited by applying a plurality of stitches through a first wall member and a second wall member of the inflatable cushion in order to secure the first wall member to the second wall member; restricting fluid flow between each of the plurality of separate inflatable cells by limiting fluid flow between the exterior surface of the non-rigid fabric diffuser member and the interior surface of the internal passageway proximate to an edge of the inlet opening of each of the plurality of separate inflatable cells such that a predetermined effective flow area is provided between a loaded cell of anyone of the plurality of separate inflatable cells and the remaining plurality of separate inflatable cells; and wherein the inflatable cushion is formed from a first sheet of material secured to a second sheet of material, the first sheet of material being secured to the second sheet of material at a seam to define portions of a periphery of the inflatable cushion, wherein the seam consists only of: a peripheral edge portion of the first sheet of material; a peripheral edge portion of the second sheet of material; and a first plurality of stitches securing the peripheral edge portion of the first sheet of material to the peripheral edge portion of the second sheet of material.

The accompanying drawings, incorporated in and constituting part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference the appended drawings, in which:

FIG. 2 is an elevational view of the airbag in FIG. 1;

FIG. 3 is a cut-away view taken along line 3-3 of FIG. 2;
FIG. 3A is a cut-away view of an alternative embodiment;
FIG. 4 is a cut-away view taken along line 4-4 of FIG. 2;
FIG. 5 is an elevational view of another embodiment of a side curtain airbag in accordance with the present invention; and FIG. 6 is a cut-away view taken along line 6-6 of FIG. 5.

Figure 1:
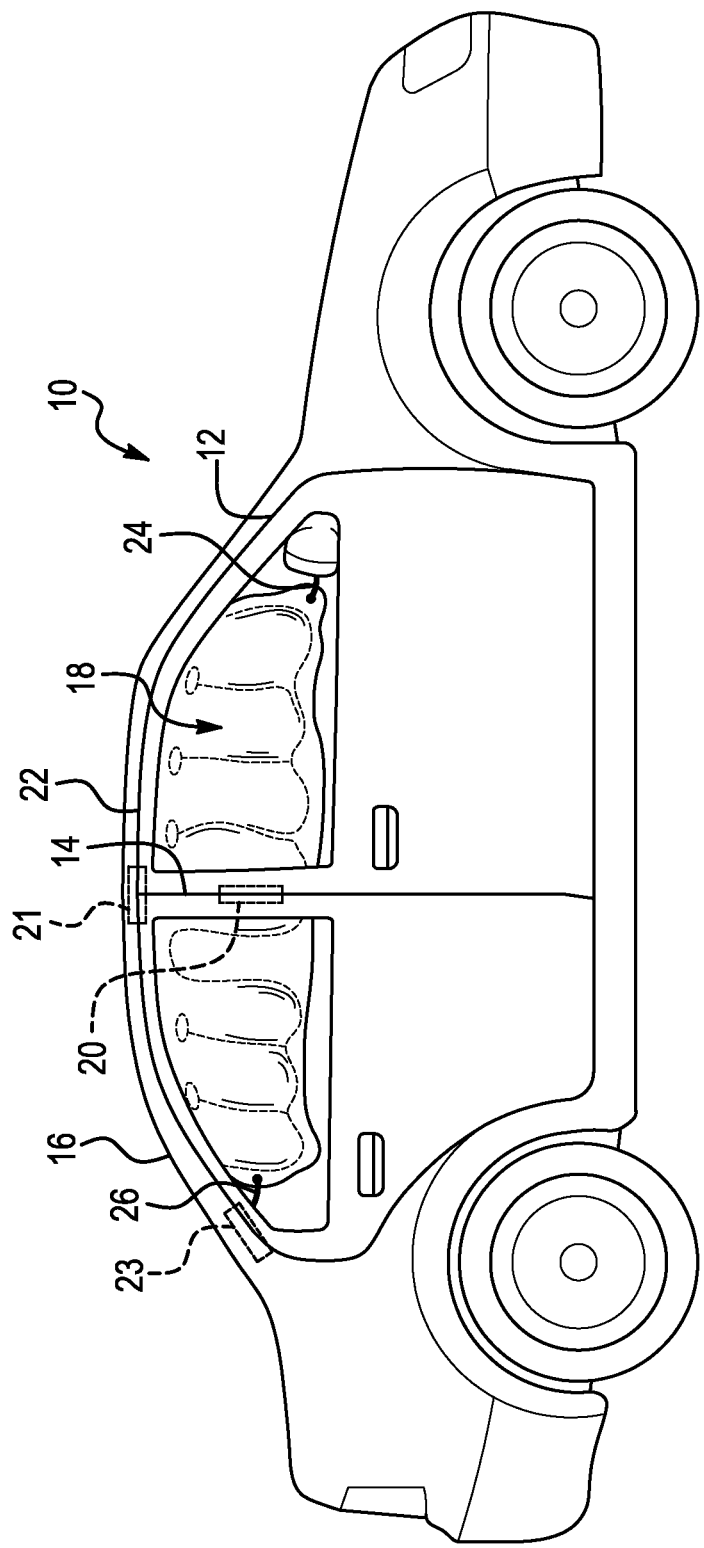
FIG. 1 is a side view of a vehicle with an inflated side curtain airbag.

Repeat use of reference characters in the present specification and drawings is intended to represent same or analogous features or elements of the invention.

DETAILED DESCRIPTION OF THE PREFERRED EMBODIMENTS

Reference will now be made in detail to exemplary embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to the drawings, and particularly to FIG. 1, a vehicle 10 is shown. Vehicle 10 includes an A-pillar 12, a B-pillar 14, and a C-pillar 16. A side curtain airbag 18 in accordance with one exemplary embodiment of the present invention is illustrated and extends between A-pillar 12 and C-pillar 16. In FIG. 1, airbag 18 is shown in an inflated state. In this regard, an inflator 20 provides a gas necessary to inflate airbag 18. Inflators 20, 21 and 23 are shown in dashed lines to display alternative locations for the inflator. Thus, the inflator may be located in the B-pillar, in the C-pillar, in the roof, or in another suitable location within vehicle 10.

Before airbag 18 is deployed, it may be stored within roof rail 22 of vehicle 10. Optionally, tethers 24 and 26 may be used to restrain airbag 18. In the embodiment shown in FIG. 1, tethers 24 and 26 attach at one end to airbag 18 and at the other end to the body of the vehicle.

Referring now to FIG. 2, further details of side curtain airbag 18 can be most easily explained. Airbag 18 includes a plurality of substantially isolated cells 28, 30, 32, 34, 36, 38, and 40. Cells 28, 30, and 32 make up a rear bank of cells between B-pillar 14 and C-pillar 16, while cells 34, 26, 38, and 40 make up a front bank of cells between A-pillar 12 and B-pillar 14. Area 42 is not inflated because an occupant is less likely to come into contact with that area. In some embodiments, however, area 42 may be a cell, or may inflate at a time later than the other cells.

Continuing to refer to FIG. 2, tabs 44 are provided in this embodiment to attach airbag 18 to roof rail 22. Instead of tabs 44, any suitable method of attachment may be used. A delivery tube 46 having a plurality of outlet orifices 48 is also provided. In the illustrated embodiment, outlet orifices 48 are formed as scoops. Orifices 48 open to cells 28, 30, 32, 34, 36, 38, and 40. To reduce turbulence within tube 46 and to better distribute the gas, outlet orifices 48 may be staggered about tube 48. Such staggering can be seen in FIG. 4. Delivery tube 46 is sealed at 50. Gas from inflator 20 enters delivery tube 46 at end 52 and is distributed into the cells through outlet orifices 48.

Referring now to FIGS. 2, 3, and 4, the mating of delivery tube 46 with airbag 18 can be described. In this embodiment, tube 46 is inserted into the top portion of airbag 18. A top perimeter seam 54 runs along the top of airbag 18 and forms an upper restraint for tube 46. A series of sewn ovals 56 are formed by stitching 57 (FIG. 3) between the cells. The tops of ovals 56 form a substantially tight fit with the bottom of tube 46. In this context, "tight" does not mean that no gas is able to flow between ovals 56 and tube 46. Instead, "tight" refers to a close-fit that may be optimized to allow some gas flow between adjacent cells. Along with continuous seam 58 and seams 66, 68, 70, 72, and 74, ovals 56 form cells 28, 30, 32, 34, 36, 38, and 40. Any of the sewn seams may be single stitched, double stitched, or attached in another appropriate manner, depending on the strength and air-tightness requirements of the airbag. Airbag 18 has a thickness t (FIGS. 3 and 4), which may vary over the cells.

Referring specifically to FIG. 4, outlet orifice 48, formed as a scoop, can be seen. The orientation of orifice 48 in FIG. 4 is somewhat staggered in that it is rotated at various angular positions around the tube periphery. The scoops preferably are rotated at various angular positions about tube 46 to better or more effectively capture and channel the gas flowing within the tube into the cell.

FIG. 5 shows a second embodiment of the present invention. In this embodiment, airbag 76 is inflated by inflator 78, which is positioned in the B-pillar adjacent the center of deployed airbag 78. Inflator 78 connects with delivery tube 80 at an intermediate location along its length, in this case near the longitudinal center. In this configuration, both of ends 82 and 84 are sealed, forcing gas into each of cells 86, 88, 90, 92, and 94 upon inflation. Tethers 96 and 97 connect airbag 76 to the vehicle body. Depending on the vehicle or application, other configurations of the present invention may include embodiments with more than two banks of cells.

Continuing to refer to FIG. 5, it can be seen that a circle 98 is sewn into cell 88. A seam 100 connects circle 98 to seam 102, which forms part of the cell's perimeter. Seam 100 partially separates cell 88 and may be designed to reduce the volume and thickness of cell 88. As can be seen in FIG. 6, a reinforcing layer 104 is included on one side of airbag 76 at circle 98. Reinforcing layer 104 is another layer of fabric sized just larger than circle 98 in this embodiment, and is stitched together with the fabric forming airbag 76. Each of ovals 56 also include a reinforcing layer 106 sized just larger than the oval. In some 30 liter airbag embodiments, a reinforcing layer that is ½ inch larger at each edge than the stitching has been used. In still further embodiments, a reinforcing layer has been used on either side of the airbag, yielding a structure with four layers in the area being reinforced.

Referring now to FIG. 6, the construction of reinforcing layer 104 may be described in more detail. First layer 108 and second layer 110 form respective sides of airbag 76. Sewn circle 98 is formed by stitching 112, which extends through first layer 108, second layer 110, and reinforcing layer 104. The advantages of using reinforcing layer 104 will be discussed later. Note, however, that other configurations, including the use of multiple reinforcing layers on either or both sides of the airbag, are contemplated by the present invention.

The novel airbag disclosed herein is designed so the flow of gas between chamber cells is substantially reduced during the loading of the airbag. By creating a more reduced gas flow between the chamber cells during loading, the pressure within a given substantially isolated cell builds up greater than would otherwise occur with an open flow between the same cells. The increased pressure within the cell due to flow restriction or cross-cell flow restriction resists the occupant from striking through the cell to a greater extent than with conventional open flow between cells. With the gas restricted in its movement out of the cell, an increased resistance to occupant displacement or strike through is established. Therefore, the present invention provides airbags and methods of making airbags that restrict flow between chamber cells.

What is meant by "striking through" or "penetrating through" the airbag is that the occupant's energy directed toward the airbag is not entirely dissipated prior to the occupant hitting a structure of the vehicle, an intruding object such as a pole, another vehicle, or the ground during a rollover event. That is, during strike through, the resistive force applied by the pressurized airbag to the occupant is insufficient to stop the movement of the occupant prior to making contact with a solid structure.

Because of the restricted flow between adjacent cells, the pressure delivery from the inflator to the cells may require a more precise design of the gas delivery system to provide each substantially isolated cell with its required operating pressure. For example, one such delivery method to achieve gas delivery to the individual cells may utilize an elongated tube (for example, delivery tube 46) extending within the upper portion of a side curtain airbag. The tube may be fabricated with the appropriate size, quantity, and location of outlet orifices to sufficiently deliver the appropriate amount of gas to each cell. Additionally, scoops configured to channel flow into a given cell may be utilized to further control the desired gas delivery. The scoops may be advantageous in areas of the delivery tube where the gas flowing in the tube tends to substantially pass by outlet orifices in the delivery tube due to the dynamics of the supersonic gas flow within the tube. When the tube has a scoop, which is essentially an indented section of the tube including an opening, the gas flowing within the tube is channeled into a particular cell.

The scoops may be staggered or staged along the delivery tube to achieve the required channeling of gas into each cell. For example, one cell may have two or more scoops but would preferably not have them directly "in-line" with each other along the longitudinal axis of the delivery tube. Instead, the scoops are preferably staggered to better or more effectively capture and channel the gas flowing within the tube into the cell.

The restrictive flow of the present invention may be characterized using the term "diode." The term "diode" is generally used in electronics to refer to a device that freely passes electrical current in one direction but not in the opposite direction. In the present invention, "diode" is used to refer generally to the restriction of flow between airbag cells. This "diode effect" is due in part to differences in pressures; during initial filling of the cells the gas pressure within the delivery tube is very high, yet the gas pressure within each pressurized cell is comparatively much lower after inflation. Thus, the gas flow into each cell occurs quite quickly, while the gas flow out of the cells and into adjacent cells, into the delivery tube, or to the atmosphere is comparatively slow.

One way to keep the gas from escaping the cell is to appropriately design how the airbag fits around the delivery tube between cells. The following example is characteristic of the fit between the delivery tube and the airbag between cells. The delivery tube is inserted between the top perimeter seam and the ovals. The ovals assist in isolating the cells or regions from each other. Given a ⅝ inch delivery tube outer diameter, the distance between the top perimeter seam and the oval's seam may be in the range of 1.02 inches to 1.10 inches (with the fabric sewn flat-no pressure). The ⅝ inch delivery tube outer diameter would have a circumference of 1.96 inches nominal. A distance of 1.02 to 1.10 inches between the oval's seam and the top perimeter seam yields an inner circumference of about 2.04 inches to 2.20 inches when expanded by the tube insertion. The clearance between the tube and the fabric opening provides enough clearance to allow for installation. However, the fit between the delivery tube and the airbag still provides enough flow restriction between the tube outer diameter and the airbag fabric to restrict the gas flow between chambers (e.g., cells).

The difference in effective flow area between cells in a conventional open flow airbag and that of an airbag in accordance with the present invention is shown in the following example. A probable effective flow area from the delivery tube into a diode cell to meet initial side impact fill requirements may have an effective flow area in the range of 0.05 square inches to 0.15 square inches for a 30 liter side airbag. This effective flow area from the tube orifices is in addition to the effective flow area occurring from the clearance between the delivery tube outer diameter and the fabric layers sewn around the delivery tube in areas between the cells. Various clearances between the delivery tube outer diameter and sewn fabric layers surrounding the tube between cells may be used, yielding different effective flow areas. For example, with a 2.04 inch fabric circumference around the tube, the maximum possible flow area between a ⅝ inch tube outer diameter and the fabric circumference would be about 0.025 square inches. With the same tube and a 2.2 inch fabric circumference, the maximum flow area would be 0.078 square inches. Given the larger 2.2 inch fabric circumference and the larger of 0.15 square inch flow area from the tube orifices, the maximum effective flow area between adjacent diode cell might be 0.23 square inches.

In a conventional airbag, the flow area, even if restricted by a 1 inch diameter opening between cells is around 0.8 square inches. A 1 inch diameter opening between cells is actually toward the much more restrictive end of current conventional airbags; many, if not all, have even larger open flow effective flow areas. The effective flow area difference in this example would yield 3 to 4 times more open flow area in the conventional design as compared to the diode design discussed above. The range of effective flow areas given for the diode design of the present invention is only an example for illustrational purposes and is not intended to limit designs into that range. Depending on cell sizes, cell volumes, or even timing requirements for filling the cells, the effective flow area requirements may change. Thus, for different sized airbags, different effective flow areas may prove effective.

The diode airbag was tested with varying fits or clearances between the tube outer diameter and the fabric between the cells. When the effective flow area between the tube outer diameter and the fabric between the cells went beyond 0.3 square inches, the chances for strike-through increased. The flow area became too great between cells, thus not as effectively increasing the pressure within the cell during loading of the cell by the mass. Therefore, it was determined that anything under an effective flow area of 0.5 square inches (flow area between fabric and tube plus the flow area from the orifices) between the adjacent cells may provide effective protection in some 30 liter airbag applications. Under 0.25 square inches flow area proved to be even more ideal.

It should be noted that cells not on the ends of the air bag may have almost double the maximum flow area of end cells, since flow can escape from a loaded interior cell into adjacent cells on both the left and the right. Because of this, the cells at the end of the airbag (the cells with only one adjacent cell) may become stiffer than interior cells (the cells with two adjacent cells) during occupant loading. The extra stiffness of the end cells should be taken into account in designing the airbag.

The gas pressures within the inflated cells of the present invention are substantially low in comparison to the pressures within the delivery tube during inflation of the cells from the inflator. Typically, a side airbag inflates during approximately the first 25 milliseconds after being triggered. The occupant interaction with the airbag may initiate around 30 milliseconds in some applications or as late as approximately 55 milliseconds or more in others. Thus, by the time the occupant is loading or interacting with the airbag cell the pressure within the delivery tube has dropped substantially. By this time, the pressure in the delivery tube may actually come close to or equalize to the pressures within the airbag cells. For example, the pressure within the cells may be between 20 to 40 kpa while the pressure within the delivery tube may be 500 kpa to 1500 kpa during initial cell filling from the inflator.

As the occupant loads the cell and increases the cell's pressure, the gas within the cell may use the delivery tube outlet orifices as a cell "vent". By the gas flowing back through the delivery tube holes and essentially being vented back to other cells in the airbag, the cell is kept from becoming excessively hard. The general goal is to have delivery tube outlet orifices sized with a large enough total effective flow area to achieve the required fill timing for a given cell while being small enough to restrict the backflow, along with the flow restrictions from the fit between the delivery tube and airbag and seam optimization, to achieve desired cell pressure increases during occupant loading.

Due to the advantages of the present invention, lower cell operating pressures may be utilized with the present invention compared to the pressures needed in similar cell inflated cross-sections using a conventional open flow construction between airbag cells. The operating pressure is the pressure the inflator must deliver to the airbag prior to occupant interaction (cell loading) to effectively dissipate the occupant's energy prior to striking through the airbag. The lower operating pressure requirement offered by the diode design is advantageous over previous art since a reduced inflator output can now achieve similar overall occupant protection performance. For example, an airbag without the more restrictive flow design of the present invention would require a higher output inflator (larger size) to fill the cells to a higher required operating pressure. A reduced output inflator or smaller size inflator required with the present invention may offer the advantages of lower cost, lower weight, and less space required to package the inflator within the vehicle.

Another possible advantage of a diode airbag is the ability to reduce the overall volume of each cell while retaining desired occupant protection properties. Reducing the cell inflated thickness of a conventional airbag will achieve this lowering of the volume, but will require an increased cell operating pressure over that of a thicker inflated cell to achieve similar occupant protection. Because of the smaller cell volume that may be required with the present invention, faster fill times and faster in-position times may be possible. This can be achieved since it typically takes less time to fill a smaller cell volume.

In the case of a diode design using a thicker cell cross-section (say 4-5 inches), the pressure could be approximately 20 kpa to meet current impact requirements. Reducing the cell volume long with the cell inflated thickness to about 2.5 to 3 inches would require an increased operating pressure of around 60 kpa. The same size inflator, however, could be used for each approach. The advantage of the 20 kpa approach is that it may apply less stress to the seams and thus, reduce overall lower airbag leakage. The approach with the 60 kpa and lower cell thickness/volume could give the advantage of faster in-position times for the same inflator output. Depending on the specific application requirements and goals, either approach may be implemented.

Alternatively and referring now to FIG. 3A, a soft or flexible delivery tube 47 may be utilized instead of a rigid or solid tube. Even a delivery tube constructed from fabric with appropriately staged outlet holes may be utilized for appropriate gas distribution to the individual cells. While more versatility and tunabilty may be allowed by using a rigid delivery tube (due to the ability to shape the tubing wall contour with scoops), the use of a more collapsible (flat lying) tube may have packaging benefits for some applications.

With a solid delivery tube, the scoops which are utilized to channel gas flow into a particular cell region can more efficiently achieve a high flow rate of gas into the cell without disrupting the more efficient laminar flow within the delivery tube. In some solid delivery tubes used for gas delivery into conventional airbags, the outlet orifices are created by perforating the tubing wall. In these cases, the perforated tube wall creates an obstruction within the tubing internal diameter. In addition to restricting the effective flow area to the remainder of the tube, the perforations create a more turbulent gas flow within the tube. Turbulent flow compared to a more laminar flow is known to create increased pressure losses. The more turbulent the flow within a delivery tube, the more these pressure losses may add up, which may lead to inefficient use of the gas energy delivered from the inflator. Thus, more effectively optimizing the delivery tube with appropriately positioned scoops for each individual cell, will use the inflator's gas energy more efficiently.

While a diode-type airbag could be used with any of a number of inflators known in the art, an extended output inflator may work better than some other inflators in rollover applications. An example of an extended output inflator is shown and discussed in U.S. Pat. No. 6,543,806 to Fink, the entire disclosure of which is herein incorporated fully by reference. One of the aspects giving the extended output inflator a performance advantage is the use of a gas mixture contained therein. One gas with a small molecular size, such as helium, in combination with a gas with a larger molecular size, such as argon, nitrogen, carbon dioxide, nitrous oxide, etc., may be utilized.

A smaller molecule gas, such as helium, may be utilized because it has been shown to more rapidly fill an airbag. This likely is because helium has a lower molecular weight of 4. For example, argon is a higher molecular weight gas with a molecular weight of almost 40. The helium molecules flow more quickly through a given flow area than a larger gas molecule, such as argon.

The initial inflation of the airbag cells from the stowed state to the inflated state typically needs to occur within 15 to 25 milliseconds (in-position time) after a signal is received from a crash sensor. In-position time is the time required for the airbag to deploy from the stowed state within the roofline of a vehicle to a substantially unfolded and inflated position covering the vehicle's interior side structure. Thus, helium in a gas mixture may give the pressurized gas mix the ability to quickly flow into the airbag to meet the required in-position timing. Helium however, due to its small molecular size, will have a greater tendency to leak through any potential leak paths in the airbag than would a higher molecular size gas. Therefore, a higher molecular size gas within the pressurized gas mixture, such as argon, gives this pressurized gas mix the characteristic of a slower leak rate through any airbag leak paths. A gas mixture can therefore be optimized to meet both demands, fast in-position time and low leakage, by utilizing the best mixture percentage scenario to meet particular application requirements.

It has been found that a cold gas inflator containing only a higher molecular size gas, such as argon, may not achieve the required 15-20 millisecond in-position fill timing alone. In a cold gas inflator, the gas within the bottle undergoes decompression during inflation and cools rapidly. The larger size gas molecules become more sluggish compared to a smaller size molecule when cooled. This sluggishness has to do with each gas's critical temperature. The larger the gas molecule, the higher the gas's critical temperature. The closer a gas comes to its critical temperature during cooling from decompression, the slower the random movement of the molecules becomes. Thus, a higher molecular weight gas will become more sluggish as it is cooled than will a lower molecular weight gas. Therefore, in general, the flow rate of a higher molecular weight gas will be lower through a given outlet area as compared to a smaller molecular weight gas.

Finding an optimum mixture of high and low molecular weight gases is important to the functionality of an airbag. The ideal gas mixture will depend on the application or, more specifically, on the internal volume of the airbag and the fill timing requirements. It has been found that airbags of a smaller internal volume, for example around 25-35 liters, may allow for a higher concentration of argon in a helium-argon mixture while meeting required fill times or in-position timing. As discussed above, providing the airbag with as high a concentration of the larger gas molecule as appropriate will achieve better gas pressure retention over time in the airbag. In particular, higher pressure retention over time is desired when rollover protection is a concern.

In larger airbag volumes, the concentration of argon may need to be reduced to assist in meeting required in-position timing for the larger volume being filled. Typical gas mixtures for smaller airbags may range from 60% helium/40% argon to 75% helium/25% argon. For the larger airbag volumes (40 L and up), the ratio of helium may need to be increased. Typical ratios found effective may range from 65% helium/35% argon to 80% helium/20% argon. These ratios are typical of ranges found effective with conventional open flow airbags.

As disclosed herein, the diode airbag designs allow for higher concentrations of argon due to techniques achieving faster in-position times more independent of the gas mix ratio. Again, these possible higher concentrations of the larger gas molecule will further enhance airbag pressure retention. Mixtures have been used with a cold gas extended output inflator or even in a single chambered cold gas inflator in the range of 50% helium/50% argon. This particular mixture provided in-position times in the 40 millisecond range. Thus, depending on fill timing requirements (longer in-position time requirements allow increased argon ratios), the concentration of the larger gas molecule, such as argon, may range from 10% to 100%.

Effusion is the rate at which a gas will pass through a porous barrier/hole/orifice or any mall potential leak path or opening. Effusion, as it applies to airbags, relates to the tendency of smaller gas molecule, such as helium, to leak through the airbag leak paths to the atmosphere at higher rate than a larger gas molecule, such as argon.

Once in the airbag, the larger gas molecule within the gas mixture may effectively act as a "blocker" to restrict the leakage of some of the helium molecules through the seam openings or other leak paths. If the larger argon molecule were not also randomly escaping through the leak paths, the helium molecules would escape more unrestricted or more freely through the leak paths. The helium molecules may now collide with the larger argon molecules, thus diverting a path which would have otherwise met directly with the atmosphere. In effect, the overall gas leakage is reduced.

Another airbag characteristic that has an influence on the required inflator gas mix ratio is the airbag's operating pressure. A distinct advantage of the lower operating pressure diode airbag of the present invention is that the gas mixture ratio may allow for a higher concentration of the larger gas molecule, such as argon. A diode airbag may be inflated to operating pressures of about 20-40 kpa as opposed to conventional open flow designs requiring around 60-120 kpa. Because a diode airbag has a lower operating pressure, a smaller amount of gas in a smaller inflator is necessary.

Additionally, a lower airbag operating pressure allows for reduced seam leakage and reduced stress to the seams. Also, it is easier for an extended output inflator to effectively maintain a lower operating pressure over an extended period of time than it would be for the inflator to maintain a higher required operating pressure. Therefore, the combination of an extended output inflator and a diode airbag design can offer significant system level advantages.

Another advantage of a lower operating pressure airbag may be reduced injury to out-of-position occupants. In some situations, an occupant may be in a position very close to a deploying airbag. Airbags are required to deploy at extremely fast rates and have been known to cause injury to occupants who intrude on the deployment path of an inflating airbag. One aspect having an influence on potential injury to the out of position occupant is the internal airbag pressure. The diode airbag of the present invention would effectively reduce the force experienced by the out-of-position occupant because of its lower internal pressure over a given surface area.

Additionally, as an airbag "tuning" benefit, the diode airbag may be designed to deliver a relatively higher pressure to only some of the cells within an airbag. It is possible to achieve a higher pressure in a selected cell(s) over the initial filling/occupant interaction event, approximately the first 20-60 milliseconds. If, for instance, certain cells would perform better with higher pressure over the initial occupant impact, tuning these cells may be advantageous. For example, cells known to interacted with an occupant during a vehicle or pole impact may be tuned to a higher pressure. Once the selected cells receive the higher pressure to meet the requirements for the initial side impact, the pressures within that particular cell may equalize with the remaining cells as the gas is gradually transferred back through the delivery tube outlet orifices.

A further performance "tuning" advantage with the diode approach is to have particular cells receive gas at a faster rate than other cells. Delivering gas at a faster rate to selected cells may yield faster in-position timing. This will allow the selected cells to pull the remainder of the airbag down and be in the fully deployed in-position state faster than if all the cells received equal amounts of the initial gas delivery. The cells targeted to be the cells to receive the higher pressure can also be the same selected to cells to have the faster filling times. These two objectives of higher cell pressure and a faster gas delivery rate work well together.

Another option with the diode approach is to create particular cell(s) or cell regions that inflate over a longer period of time. These cells could be cells that are not required during the initial side impact, but are needed in time for a rollover type event. This may be achieved by having delivery tube outlet orifices with an effective flow area substantially smaller than that of the tube orifices used for filling the cells needed for the initial side impact. These smaller outlet orifices could be in direct communication with the slower filling cells. Instead of these slower filling cells filling in the 15-25 millisecond time frame, they could fill relatively slower, 100-500 milliseconds or even longer, for example.

By using the slower filling cell option, less inflator output may be required for the initial side impact requirement because less total volume is required to be filled. Then, the cells that fill over the longer period of time need to fill only to a lower pressure compared to the initially faster filled cells, as much as half the pressure or less. Thus, the total inflator output requirement is reduced by staging the inflation of selected cells. Yet, the total protection area is provided as needed, when and where it is needed.

In particular, slower filling cells could be cells which fill to provide protection on the roof area or ceiling of the vehicle. These cells would not necessarily be required during an initial side impact event, but would provide benefit during a rollover event. The time requirement for these cells to fill may be relatively much later in time to that of the cells utilized during the side impact event.

With the inflatable cells filling for roof protection, there may not be as much room between an occupant's head and the roof. Especially with larger or taller occupant's, this will be the case. For the cells intended to cover a larger surface area within the roof liner, the airbag can alternatively be stowed in an unfolded condition within the roof liner. This would allow for essentially immediate or pre-existing in-position timing and reduce concerns about airbag positioning in cases with taller occupants.

Another application for slower filling cells could be to expand the inflated airbag cell coverage area over the side structure of the vehicle. This provides expanded protection in a vehicle rollover, as the occupant may be tossed around and come into contact with areas of the vehicle not typical of non-rollover events.

It is possible that areas within a particular airbag which were not intentionally designed to fill with gas may fill gradually over time. The reason for these additional unintended cells may be the fact that seams used to close-off these un-inflated airbag areas actually allow leakage through the seams and into the unintended cell area. As an extended output inflator continues to supply pressure to an airbag, these unintended cells fill with gas. Depending on the degree of leakage in the seam, the time it takes for the unintended cells to fill may vary. In one particular airbag, the unintended cell filled in approximately 1 second, as viewed on video monitoring of the deployment. Optionally, the offending seams creating the unintended cells may be strategically opened, creating slower filling cells. Furthermore, the total tension in the airbag may be further increased by the expansion of these slower filling cells over time.

Occupant containment is another demand required of an airbag. Occupant containment is the ability of a deployed airbag to keep the occupant within the vehicle, preventing possible ejection of the occupant through a window opening. Airbag tension over a window opening has an effect on the degree of containment or occupant displacement beyond the window opening. With an airbag in accordance with the present invention, it is likely that less displacement of the cell at the airbag cross-section level will occur. This may translate into less total occupant excursion when compared to a similar cell inflated cross-section at the same pressure level using conventional open flow between cells, which likely would deform to a greater extent.

Yet another option that could be added to an airbag in accordance with the present invention is inflatable straps. Straps are often used to anchor an airbag to the vehicle. Having the straps inflate will decrease their length as compared to their un-inflated state, thereby creating tension within the straps and the airbag to which they are affixed. Configuring the straps to inflate after the initial inflation of the airbag could advantageously add tension to the airbag at a time when it would otherwise be losing tension due to pressure loss.

The following example highlights some of the advantages of the diode design of the present invention by comparison to a conventionally designed airbag. In this particular comparison example, a two-row coverage (A to C pillar) airbag with an approximate volume of 30 liters is used. The airbags in this comparison example were both cut and sewn airbag constructions without seam sealing and used a similar fabric.

The conventional open flow airbag has been found through dynamic pole testing to require an operating pressure of around 60-70 kpa to prevent occupant head strike through. The internal volumes of the airbags were essentially held constant at 30 liters. The airbags were each subjected to energy absorbing tests where a fixed mass is dropped from a predetermined height into each airbag in the same location/area. Also, similar inflated cross-section thicknesses were utilized. The mass used was a 6.5 inch diameter shape, which approximately simulates the surface area of an occupant head. Tests of both types of airbags revealed that the conventional open flow airbag required approximately two to three times more pressure to prevent the same mass energy from striking through an airbag as compared to the pressure required by a diode airbag in accordance with the present invention.

This difference in the operating pressure requirement allows a diode airbag to use a substantially smaller inflator. In the example above, simulating side impact protection only (non rollover), the inflator requirement in the conventional open flow airbag to yield 60 kpa requires a 2.3 molar output cold gas inflator (He/Ar). The inflator required by the diode airbag to meet an approximate 22 kpa operating pressure is a 1.5 molar output cold gas inflator (He/Ar). Thus, the conventional airbag requires an approximate 50% higher molar output inflator than the diode airbag. This is due in part to the lower operating pressure requirement of the diode airbag, but also to the reduced airbag stress allowed by the lower operating pressures (lower airbag leakage).

Using the same sewn/unsealed airbag examples, airbag/inflator combinations were then evaluated as they relate to rollover protection. It was determined that the conventional open flow airbag would require approximately 15 kpa at 5 seconds to sufficiently meet containment requirements, given a 5 second containment objective. Given that fixed 5 second objective, a diode airbag will perform similarly on containment objectives with an airbag pressure of around 10 kpa at 5 seconds. This pressure value for a diode airbag is estimated from the reduction in displacement within the loaded cell cross-section on a diode airbag compared to the conventional airbag. Through testing, it was determined that the conventional airbag required a 3.5 molar output cold gas Extended Output Inflator (EOI) to meet the approx. 15 kpa at 5 seconds. Preliminary testing also found that the lower operating pressure diode airbag to requires a 2.5 molar output cold gas EOI to meet the 10 kpa at 5 seconds criteria.

Seam sewing to reduce leak paths for enhanced pressure retention in unsealed airbags can also affect the performance of an airbag. Airbag leakage can be broken down into several key leak paths. First, leakage may occur through the base fabric, which is more commonly referred to as fabric permeability. The permeability is the rate of gas leakage through the fabric structure or through the thread weaves. Several methods can be employed to reduce or effectively eliminate this potential leak path. One conventional method is to coat the fabric with a gas impermeable substrate such as silicon. Other coatings such as neoprene, polyurethane, polyester, etc. or others may be used. Another commonly known method is the use of laminates. Yet another method to reduce fabric permeability is dipping a fabric in a solution that penetrates and bonds/adheres to the fabric creating a barrier to leakage.

In the fabrics coated with silicon, it has been found that higher levels of coating help to reduce airbag leakage. A typical coating level used in a popular 420 denier nylon fabric is 0.7 ounce per square yard of coating. At this coating level, the permeability may be substantially reduced compared to a non-coated fabric. However, some permeability is present, especially as the pressures are increased.

In side curtain applications, the airbag operating pressures are well above atmospheric pressure. A typical pressure could be 50 kpa to 120 kpa and beyond. At these higher pressures and with the large surface areas required to make up a side curtain, the impact of the fabric permeability more substantially affects the total airbag leak rate. This is especially true as the time requirements for maintaining an inflated airbag increase. The fabric permeability may be low compared to uncoated fabrics but even small amounts can surely add up when considered in totality over the entire surface area of the airbag.

A second leak path exists in areas where a seam is used to join fabric panels. One commonly practiced method to create a seam is to sew the fabric panels together using stitching (sewn seams). With a sewn seam, several potential leak paths exist. One leak path exists between the fabric panels as the panels are sandwiched together by the sewn seam. That is, leakage may occur between the fabric layers through the perimeter opening of the fabric. Increasing the density of the stitching may also reduce leakage.

Yet another leak path exists where a needle hole is created during the stitching process as the needle thread is passed through each panel fabric layer. As the stitching thread passes through the created needle holes, it will assist in blocking some gas flow. However, some degree of leakage will still exist.

Another method used to reduce airbag leakage has been termed "Seal and Sew". This method utilizes an adhesive or sealant that is applied to fabric panels in all the areas that are needed to create the pattern and shape of the inflated airbag. Then, for increased strength and integrity, a sewn stitch is added in the center of the sealant bead. While this method has been found to reduce airbag leakage and be a potential option for increased pressure retention, drawbacks exist. The adhesive/sealants required are quite expensive. The application process has been deemed "messy" and time consuming. The needle passing through the adhesive bead can pick up contaminants from the sealant bead, which may then negatively affect the sewing process. A cure time is also required after applying the adhesive bead prior to sewing. Another substantial drawback with the "seal and sew" method is that the seam requires an increased package size when the airbag is folded and stored in the stowed position in the vehicle roof line area.

A fabric type known for low permeability is disclosed in Published U.S. Patent Application 2004/0242098 A1 (the '098 application) to Bass, published on Dec. 2, 2004 and incorporated herein by reference. Such a fabric has advantages for reduced leakage due to its extremely low permeability, while also displaying favorable leak prevention characteristics at the seam level. The treated fabric has been found to have reduced leakage at the needle hole leak path as compared to other fabric alternatives. Such a fabric also appears to more effectively mold around the thread and create a better seal against gas escaping through the needle hole.

Another common seam construction method is called OPW or One Piece Woven. This process weaves the fabric panels together to create an interconnected seam as the fabric is passed through a loom. This method yields fewer leaks because no thread is used. However, OPW is still susceptible to seam stress from inflation, and leak paths may be created in these seam areas.

Because a smaller needle size generally yields less leakage, several combinations of thread sizes and needle types/sizes were explored. Three different thread sizes were used (#138, #92 and #69 thread sizes). The most commonly used thread size in automotive airbags is the #138 size in nylon. After matching each thread size with the best needle to efficiently deliver the thread without breakage or seam inconsistencies, the thread size/needle combinations were tested to comparatively evaluate seam leak rates.

To more effectively evaluate seam leakage and compare multitudes of variables (such as seam density, thread size, needle size, needle point type, thread type, thread brand, bobbin thread tension, needle thread tension, and fabric type), fabric swatches were sewn together to create multitudes of small inflatable square shaped "pillows." The test specimen pillows were used to evaluate seam leakage at the outer pillow perimeter seam along with a circular seam sewn in the center. Four fabrics were used for comparisons with the varying seam constructions—fabric disclosed in the '098 application in 315 and 420 denier and silicon coated 315 and 420 denier fabric (both having approximately 1 oz/sq yd of coating).

The test pillows were pressurized to pressures of both 20 kpa and then 60 kpa and maintained at each of those levels during leak evaluations. Three methods were used to evaluate the leakage—submersion of the pillows with visual observation, spray of the seam with a bubble leak check solution and lastly, electronically monitoring the pressure decay after shutting off the supply pressure.

The seam in the center was chosen to simulate a higher stressed type seam that is typical of many side curtain airbag patterns. These types of higher stressed seams are those that have the airbag inflatable areas pulling up on the seam around substantially the entire seam perimeter. In addition, these seams are typically of relatively small size so as to not add too large of an un-inflated area within a required protection zone of the airbag. Therefore, these higher stressed seams have a relatively small seam length (circumference) exposed to some of the highest forces occurring within the inflated airbag. These higher stressed seams generally occur in the inner areas of the inflated side curtain. It is these higher stressed seam areas which generally develop the most notable degree of leakage under pressurization. Thus, finding the best solutions to reduce leakage on these highly stressed seams will prove quite beneficial for enhanced airbag pressure retention.

Through testing, it was discovered that by adding an additional small fabric layer to the exterior side(s) of the airbag, substantially reduced leakage resulted. This is advantageous in areas that undergo much higher stresses during inflation and pressurization. The reinforcements could be small circular cutouts covering the circular center seam.

Externally positioned reinforcements serve a dual purpose. First, they add additional fabric strength to the highly stressed seam area, thus effectively reducing the spreading apart of the fabric weave. Second, the fabric layer takes on a gasketing effect to reduce the leakage which would otherwise flow more easily through the needle holes.

Comparative tests were also conducted with the reinforcing layer(s) positioned on the inside of the pillow surfaces or within the pressure boundary. Positioning on the inside showed substantially less promise in reducing leakage. Some minor benefit was realized by adding strength or resistance to the spreading of the outer fabric weave, but the overall leakage in these stress point areas were still substantially higher than with the fabric reinforcing layer sewn on the outside surface or exterior sides of the pillow.

Therefore, in higher stressed areas of an airbag, externally positioned reinforcing layers can improve pressure retention. Both the silicon coated fabric reinforcing layers and the '098 application fabric reinforcing layers were found effective when positioned externally. The '098 application fabric showed an edge over the silicon coated fabric. The silicon fabric displayed better results with the coated surface facing the airbag.

The results related to seam density along the perimeter showed that in all the fabric types a higher seam density provided lower overall leakage. A seam density of 18 to 22 stitches per inch with a #92 thread being preferable. As the density was increased beyond approximately 24 stitches per inch, no appreciable reduction in leakage was seen with any of the thread sizes. A #92 thread allows for approximately 50% more thread length to be wound onto the bobbin case/spool compared to a #138 thread. This allows for reduced change-over times when replacing the bobbin spools. Also, the smaller #92 thread cross-section reduces the seam thickness, which has advantages when the airbag is folded.

It was also discovered that too low a bobbin tension resulted increased leakage. The lower bobbin tension is not as effective in bunching together the fabric to better restrict leakage in the seam. So, a combination of an appropriate higher bobbin tension combined with a needle tension of approximately 2-4 times more than the bobbin tension have been found quite effective in reducing leakage. Also, a polyester thread with silicon additive has been found to process through the machine/needle more effectively than even a same thread size #92 in nylon.

Utilizing a cold gas inflator for the inflation of the airbag allows for the use of a polyester thread. Conventionally, many airbags utilized inflators with hotter gas outputs, and, therefore, required nylon thread, or in some cases even threads with higher temperature resistance such as brands of Kevlar or Nomex. In the case of using a cold gas inflator, the use of a polyester thread type is possible.

A combination found most effective is the use of a polyester Coats brand, #92 thread size of bonded construction, with a silicon additive. The needle found most effective is a 100-16. The needle point type found most effective is an RG. This type of needle will produce less cutting or abrasion of the fabric during sewing, while not adversely affecting the leak rate. The tension for the bobbin thread found most effective is 6-9 ounces. A corresponding effective tension for the needle thread was found to be 18-25 ounces.

Additionally, the elongation of the different thread types were found to have an effect on leakage. Generally, a stiffer thread yields a lower leakage rate during airbag pressurization. Too stiff a thread may adversely affect the stitch breaking strength, but a thread such as a bonded polyester has been found quite effective. A thread utilizing a higher content of silicon coating or treatment could prove to be even further advantageous for reducing sewn seam leakage.

Several techniques in sewing the actual patterns into the airbag have also uncovered advantages for reduced leakage. Some of these methods can also improve upon process time while providing favorable seam uniformity and consistency. In sewing the smaller circular, oval, oblong, etc. shaped patterns, utilizing a programmed machine can provide superior seam uniformity. These program machines move the fabric in the circular pattern without the need for turning the entire airbag through a 360 rotation.

It has also been noted that the utilization of a single seam to connect a centrally located seam (circular for example) back to the airbag perimeter seam also may reduce leakage. The number of needle holes created for this connecting seam is reduced by about half when compared to a conventional dual seam.

Another feature found helpful for reducing leakage is to fold the airbag at the bottom perimeter as opposed to using a seam and two separate fabric panels. This technique is known in the industry as a "taco fold."

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What is claimed is:

1. An inflatable cushion for an airbag module, comprising:
    a first layer of material;
    a second layer of material, the first layer of material being secured to the second layer of material at a non-woven seam to define the inflatable cushion;
    wherein the non-woven seam consists only of: a first plurality of stitches; a peripheral edge portion of the first layer of material; and a peripheral edge portion of the second layer of material; and wherein no adhesives or sealants are within the non-woven seam after applying the first plurality of stitches; and
    wherein the inflatable cushion has an internal pressure of at least 10 kpa at at least 5 seconds after being inflated by a gas inflator.

2. The inflatable cushion as in claim 1, wherein the first layer of material and the second layer of material are 420 denier fabric.

3. The inflatable cushion as in claim 2, wherein the first layer of material and the second layer of material have a coating.

4. The inflatable cushion as in claim 3, wherein the first plurality of stitches are formed by a 92 size thread.

5. The inflatable cushion as in claim 1, wherein the first plurality of stitches are formed by a 92 size thread and the first plurality have a density of greater than 20 stitches per inch.

6. The inflatable cushion as in claim 1, wherein the first layer of material and the second layer of material have a coating.

7. The inflatable cushion as in claim 6, wherein the first plurality of stitches are formed by a 92 size thread.

8. The inflatable cushion as in claim 7, wherein the first plurality of stitches are formed by a polyester thread.

9. The inflatable cushion as in claim 1, wherein the inflator is a cold gas inflator.

10. The inflatable cushion as in claim 9, wherein the cold gas inflator is a 2.5 or less molar ouput inflator.

11. The inflatable cushion as in claim 1, wherein the inflatable cushion further comprises at least one other seam located away from the peripheral edge portion of the first layer of material and the second layer of material.

12. A method of inflating an inflatable cushion, the method comprising:
controlling the flow rate of an inflation gas into the inflatable cushion by limiting an amount of surface area between an exterior surface of a non-rigid fabric diffuser member and an interior surface of an internal passageway formed in the inflatable cushion section, the internal passageway linking and fluidly coupling to each of a plurality of separate inflatable cells only via an inlet opening of each of the plurality of separate inflatable cells, the inflatable cushion being formed from a first material and the diffuser member consists essentially of a non-rigid fabric member formed from a permeable material, the non-rigid fabric member is independent of the first material used to form the inflatable cushion and the permeable material of the non-rigid fabric member is the main source of fluid flow into the inlet openings of the plurality of separate inflatable cells such that the inflation gas must pass through the permeable material, wherein the amount of surface area between the exterior surface of the non-rigid fabric diffuser member and the interior surface of the internal passageway proximate to the inlet opening of each of the plurality of separate inflatable cells is limited by applying a plurality of stitches through a first wall member and a second wall member of the inflatable cushion in order to secure the first wall member to the second wall member;
restricting fluid flow between each of the plurality of separate inflatable cells by limiting fluid flow between the exterior surface of the non-rigid fabric diffuser member and the interior surface of the internal passageway proximate to an edge of the inlet opening of each of the plurality of separate inflatable cells such that a predetermined effective flow area is provided between a loaded cell of anyone of the plurality of separate inflatable cells and the remaining plurality of separate inflatable cells; and
wherein the inflatable cushion is formed from a first sheet of material secured to a second sheet of material, the first sheet of material being secured to the second sheet of material at a seam to define portions of a periphery of the inflatable cushion, wherein the seam consists only of: a peripheral edge portion of the first sheet of material; a peripheral edge portion of the second sheet of material; and a first plurality of stitches securing the peripheral edge portion of the first sheet of material to the peripheral edge portion of the second sheet of material.

13. The method as in claim 12, wherein the predetermined effective flow area is greater than 0 and less than 0.5 square inches.

14. The method as in claim 13, wherein the predetermined effective flow area is greater than 0 and less than 0.25 square inches.

15. The method as in claim 12, wherein the first sheet of material and the second sheet of material are 420 denier fabric.

16. The method as in claim 15, wherein the first sheet of material and the second sheet of material have a coating of approximately 1 ounce per square yard.

17. The method as in claim 16, wherein the first plurality of stitches are formed by a polyester thread.

18. The method as in claim 16, wherein the first plurality of stitches are formed by a silicon coated polyester thread.

19. The method as in claim 12, wherein the first sheet of material and the second sheet of material have a coating of approximately 1 ounce per square yard.

20. The method as in claim 19, wherein the first plurality of stitches are formed by a polyester thread.

21. The method as in claim 20, wherein the first plurality of stitches are formed by a silicon coated polyester thread.

22. An inflatable cushion for an airbag module, comprising:
a first layer of material;
a second layer of material, the first layer of material being secured to the second layer of material at a non-woven seam to define the inflatable cushion;
wherein the non-woven seam consists of: a first plurality of stitches; a portion of the first layer of material; and a portion of the second layer of material; and
wherein no adhesives or sealants are within the non-woven seam after applying the first plurality of stitches; and
wherein the inflatable cushion has an internal pressure of at least 10 kpa at at least 5 seconds after being inflated by a gas inflator.

23. The inflatable cushion as in claim 22, wherein the portion of the first layer of material comprises at least a peripheral edge portion of the first layer of material and wherein the portion of the second layer of material comprises at least a peripheral edge portion of the second layer of material.

* * * * *